United States Patent
Huang et al.

(10) Patent No.: US 8,155,213 B2
(45) Date of Patent: Apr. 10, 2012

(54) SEAMLESS WIRELESS VIDEO TRANSMISSION FOR MULTIMEDIA APPLICATIONS

(75) Inventors: Shih-Chia Huang, Taipei (TW); Sy-Yen Kuo, Taipei (TW)

(73) Assignee: National Taiwan University, Taipei (TW)

( * ) Notice: Subject to any disclaimer, the term of this patent is extended or adjusted under 35 U.S.C. 154(b) by 834 days.

(21) Appl. No.: 12/260,083

(22) Filed: Oct. 28, 2008

(65) Prior Publication Data

US 2010/0002771 A1      Jan. 7, 2010

(30) Foreign Application Priority Data

Jul. 4, 2008     (TW) ................................ 97125378 A

(51) Int. Cl.
H04N 7/12 (2006.01)
H04N 11/02 (2006.01)
H04N 11/04 (2006.01)

(52) U.S. Cl. ......... 375/240.27; 375/240.11; 375/240.12; 375/240.14; 375/240.15; 375/240.16; 375/240.17

(58) Field of Classification Search ........... 375/240.11–240.17, 240.27
See application file for complete search history.

(56) References Cited

U.S. PATENT DOCUMENTS

2007/0153898 A1* 7/2007 Yim .................... 375/240.16
2008/0186404 A1* 8/2008 Bull et al. .................... 348/616

OTHER PUBLICATIONS

Shih-Chia Huang and Sy-Yen Kuo, "Temporal Error Concealment for H.264 Using Optimum Regression Plane", The 14th International Multimedia Modeling Conference, Jan. 9-11, 2008, Kyoto University, Japan.

* cited by examiner

Primary Examiner — Edan Orgad
Assistant Examiner — Kari Schmidt
(74) Attorney, Agent, or Firm — Lin & Associates IP, Inc.

(57) ABSTRACT

A method of temporal error concealment for generating the image data of the missing macro-blocks in the current frame by using the previous frame and the correct data of the current frame is disclosed. The method includes the steps: first using Optimal Regression Plane to estimate the space motion vectors for each block in the missing macro-blocks; selecting appropriate motion vectors from the estimated space motion vectors and the correct temporal motion vectors in the previous frame as the candidate motion vectors; dividing the missing macro-block into sub-blocks with optimal size; fine tuning the candidate motion vectors as the predicted motion vectors; and using the predicted motion vectors to generate the predicted image data for the missing macro-block and further concealing the effect of the missing macro-blocks upon the image quality of the current frame. The method reduces the computation time, speeds up the process, and improves the image quality.

11 Claims, 7 Drawing Sheets

(a) T1(16×16)

(b) T2(16×8)

(c) T3(8×16)

(d) T4(8×16)

SEAMLESS WIRELESS VIDEO TRANSMISSION FOR MULTIMEDIA APPLICATIONS

BACKGROUND OF THE INVENTION

1. Field of the Invention

The present invention relates generally to a seamless wireless video transmission for multimedia applications, and more particularly, to a temporal error concealment (TEC) method for concealing a temporal error of an image frame caused by a missing macroblock.

2. The Prior Arts

Image transmission service including video meeting, website browsing, image file transmission, is a very important service provided by communication and IT enterprises. Typically, an original image file desired to be transmitted is often too large to be effectively transmitted over the internet, or often occupies too much memory space of the storage device. As such, an image file is often performed with a coding process with a high compression ratio and a low loss ratio before transmission for reducing the size of the image data. Such a coding process may be selected from TIFF, JPEG, MJEP, MPEG, H.264/AVC, in accordance with the demands of the system for the image compression ratio, the loss ratio, so as to obtain an optimal algorithm for static images or continuous images.

However, when being transmitted, the encoded image file is often interfered by the transmission interface or the electrical system of the receiving end. Such interferences usually cause damages or errors of the image file data, so that the receiving end becomes incapable of decoding and recovering the encoded image file back to original by a predetermined corresponding decoding method.

In accordance with psychology of vision, an individual edge would not affect visional recognition. However, such an individual edge may be mutually affected with edges adjacent thereto so as to generate a composition effect. In this concern, human vision is more sensitive to edge distortions. Generally, edge distortions include blurred edges and newly created false edges. As such, it is very important to maintain original edges and avoid the creation of false edges when executing an image process.

A method of recovering or obtaining image data of a missing macroblock according to image data of correct macroblocks of a same frame of the missing macroblock is generally called the SEC method.

There are many algorithms of conventional technologies have been proposed for SEC, such as bilinear interpolation (BI), directional interpolation (DI), and best neighborhood matching (BNM). However, all these SEC methods require a large amount of interpolation computation, and often consume much time, and therefore are often believed to be less efficient. Such SEC methods are usually applied for a first image of consecutive images, because the first image has no previous frame to refer to.

A further method proposed as another solution is called the TEC method. According to the TED method, a motion vector of a missing macroblock can be achieved by referring to a correct image data of a previous frame. Then, a reference frame is moved according to the motion vector, and therefore the image data of the missing macroblock can be thus obtained. In such a way, the negative affection to the entire image frame caused by the missing macroblock can be concealed.

In conventional TEC methods, a zero motion vector, neighboring motion vectors (motion vectors), an available motion vector of a spatially corresponding macroblock in a previous frame, or a median (or an average) of spatially adjacent motion vectors can be used. A TEC method called motion field interpolation method is recently proposed. According to the motion field interpolation method, a best motion vector is determined from the above candidate motion vectors by the boundary matching algorithm (BMA), which calculates the minimum sum of absolute differences (SAD) along the one-pixel-wide boundary between the missing macroblock and its candidate replacements in the H.264 JM decoder.

However, the conventional technology usually calculates an optimal motion vector by complex computation, which requires a large amount of computation and consumes much time, and negatively affects the overall decoding efficiency.

As such, an efficient TEC method which is demanded for obtaining decoded images while reducing the amount of computation, as a solution to the difficulty of the conventional technology.

SUMMARY OF THE INVENTION

A primary objective of the present invention is to provide a temporal error concealment (TEC) method for obtaining an image data of a missing macroblock by referring to a correct image data of a previous image frame and a correct image data of the current image frame, thus concealing a spatial error image data of the missing macroblock of an encoded image frame.

A further objective of the present invention is to provide a TEC method. The TEC method uses a multiple polynomial regression equation to construct an optimal regression (OR) plane of the motion vectors of the missing block according to boundary blocks of the missing macroblock, so as to predict a spatial motion vector of each block of the missing macroblock. The predicted spatial motion vectors serve as highly spatial correlated motion vectors.

A still further objective of the present invention is to provide a TEC method for selecting an optimal candidate motion vector. With respect to high spatially correlated spatial motion vectors and high temporally correlated temporal motion vectors of corresponding blocks in a previous frame, the TEC method estimates each spatial motion vector and each temporal motion vector by adjacent external boundary matching errors (AEBME), according to a boundary matching algorithm (BMA), so as to select an motion vector having a least AEBME as a candidate motion vector.

A further objective of the present invention is to provide a TEC method. The TEC method includes dividing the missing macroblock into blocks of 16×16, 8×16, 16×8, or 8×8 pixels according to the Laplacian distribution of a motion field composed by candidate motion vectors. Then the TEC method selects blocks of a maximum probability according to the Bayes principle and a Laplacian-modeled motion filed, i.e., blocks of 16×16, 8×16, 16×8, or 8×8 pixels. If the missing macroblock has a relatively regular motion, then larger blocks, e.g., blocks of 16×16 pixels, are more suitable for subsequent motion refinement. On the contrary, if the missing macroblock has a relatively complex motion, the smaller blocks, e.g., blocks of 8×8 pixels, are more suitable for subsequent motion refinement.

A furthermore objective of the present invention is to provide a TEC method, for fine tuning candidate motion vectors to obtain motion vectors of the missing macroblocks, by a rapid searching comparison. With respect to sub-macroblocks of a best missing macroblock of the blocks of different sizes, the TEC method utilizes a spiral scanning path starting from an average motion vector to achieve a first AEBME, sequentially according to the corresponding AEBME values, along motion vectors of all boundary blocks, thus obtaining an adaptive search range (ASR). If the ASR is equal to or less than a threshold value, the motion vector is taken as a motion vector of the missing macroblock, and the threshold value is determined by a proximity of the AEBME value to an original residual value of a sum of absolute differences (SAD). The image data of the missing macroblock can be obtained by moving the candidate macroblock to the position of the missing macroblock according to the motion vector, and thus concealing the negative affection caused by the missing macroblock to the entire image frame.

The TEC method according to the present invention not only saves the computation time and accelerates the processing speed, but also provides a high efficient image decoding method.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
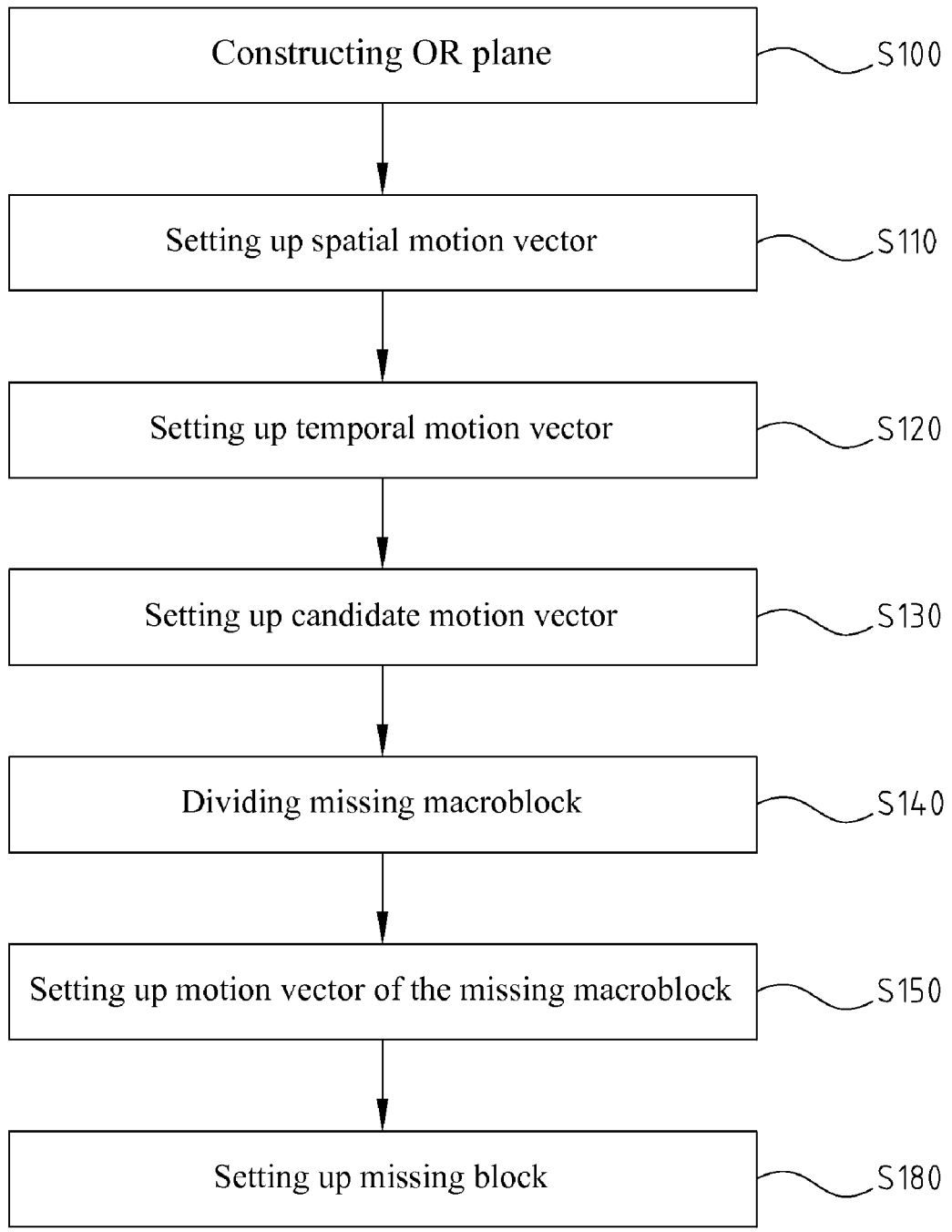
FIG. 1 is a flow chart illustrating a TEC method according to an embodiment of the present invention.

We assume that all missing macroblocks have been accurately detected, and all boundary blocks surrounding the missing macroblock contain correct image data including motion vectors. Referring to FIG. 1, there is shown a flow chart illustrating a TEC method according to an embodiment of the present invention. The flow chart includes steps S100 through S280, to be discussed in more details herebelow.

First, at step S100, an optimal regression (OR) plane is set up according to motion vectors of the boundary blocks. An N-pixel-wide block group surrounding the missing macroblock includes a plurality of N×N pixel-wide blocks, in which N is a positive integer. As shown in the drawing, the embodiment is exemplified with N=4 for illustration. However, in other embodiments, N can be any other positive integers other than 4.

Figure 2:
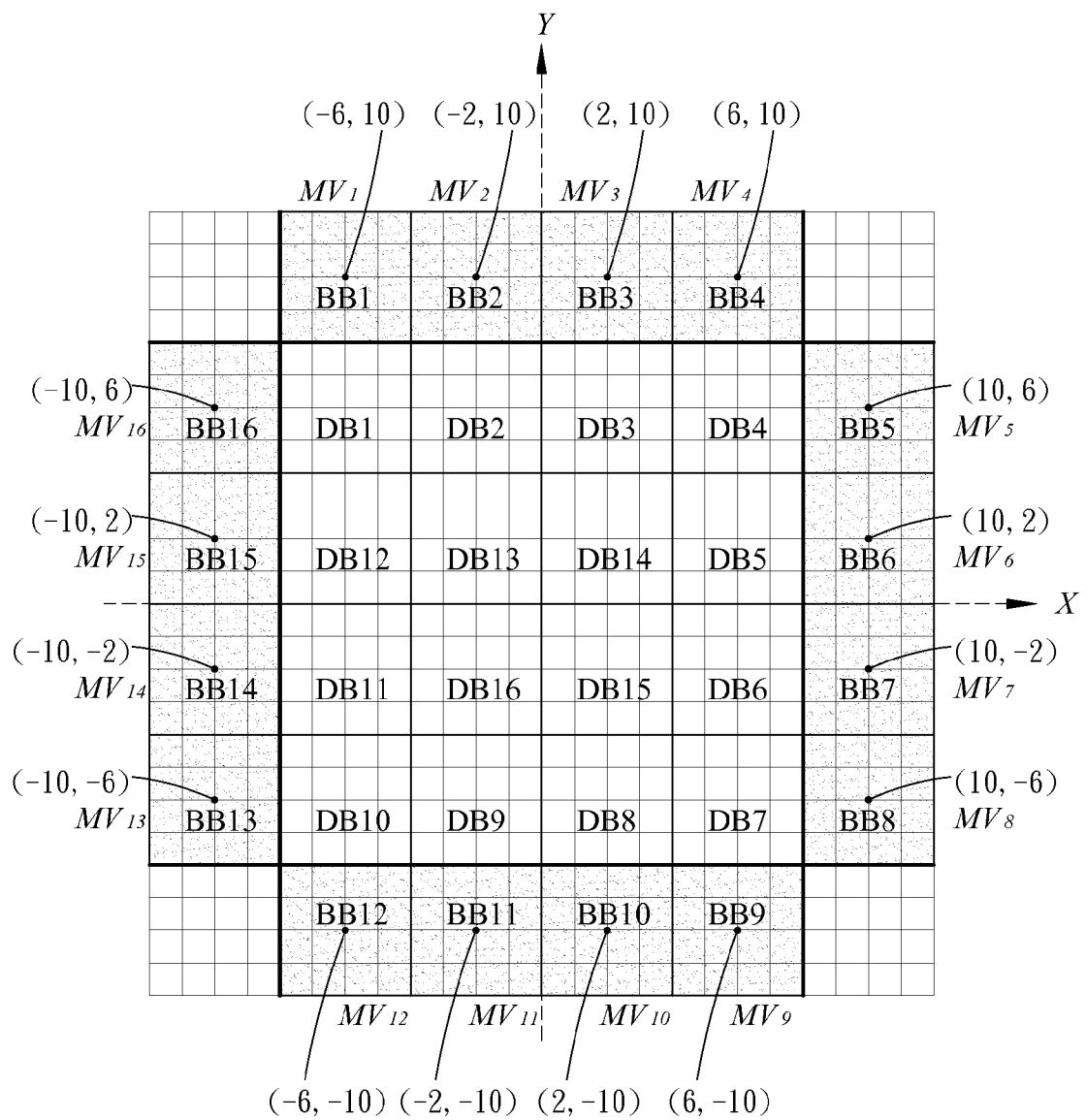
FIG. 2 is a schematic diagram illustrating boundary blocks according to an embodiment of the present invention.

FIG. 2 is a schematic diagram illustrating boundary blocks according to an embodiment of the present invention. Referring to FIG. 2, it shows a missing macroblock 20 including 16 missing blocks, i.e., DB1, DB2, . . . , DB16. The missing blocks are surrounded by 16 boundary blocks, i.e., BB1, BB2, . . . , BB16. Further, each of the boundary blocks BB1, BB2, . . . , BB16, has a corresponding motion vectors, motion vector1 through motion vector16, respectively, for representing a temporal correlation with a previous frame.

For convenience of illustration, a coordinate system is set up in FIG. 2, in which a center of the missing macroblock 20 is set as an origin of coordinate, i.e., P0 (0, 0), and a pixel is defined as a unit of length. In this case, coordinates of the boundary blocks BB1 through BB16 are:

BB1 $(x_1, y_1)=(-6, 10)$
BB2 $(x_2, y_2)=(-2, 10)$
BB3 $(x_3, y_3)=(2, 10)$
BB4 $(x_4, y_4)=(6, 10)$
BB5 $(x_5, y_5)=(10, 6)$
BB6 $(x_6, y_6)=(10, 2)$
BB7 $(x_7, y_7)=(10, -2)$
BB8 $(x_8, y_8)=(10, -6)$
BB9 $(x_9, y_9)=(6, -10)$
BB10 $(x_{10}, y_{10})=(2, -10)$
BB11 $(x_{11}, y_{11})=(-2, -10)$
BB12 $(x_{12}, y_{12})=(-6, -10)$
BB13 $(x_{13}, y_{13})=(-10, -6)$
BB14 $(x_{14}, y_{14})=(-10, -2)$
BB15 $(x_{15}, y_{15})=(-10, 2)$
BB16 $(x_{16}, y_{16})=(-10, 6)$;

and the motion vectors thereof are marked at centers of the corresponding boundary blocks.

The OR plane is constructed by a multiple polynomial regression model of equation (1): $Z(x, y)=c+a_1 x+a_2 x^2+b_1 y+b_2 y^2$, in which Z represents the motion vectors, and $a_1, a_2, b_1, b_2, c$ are coefficients to be determined.

After regression analysis, an equation (2) as following can be obtained.

$$Z(x, y) = \left[\frac{1}{106496}\sum_{i=1}^{16} MV_i \cdot (27x_i^2 + 25y_i^2 - 3120)\right]x^2 + \qquad (2)$$
$$\left[\frac{1}{960}\sum_{i=1}^{16} MV_i \cdot x_i\right]x + \left[\frac{1}{106496}\sum_{i=1}^{16} MV_i \cdot (25x_i^2 + 25y_i^2 - 3120)\right]y^2 +$$
$$\left[\frac{1}{960}\sum_{i=1}^{16} MV_i \cdot y_i\right]y - \frac{1}{512}\sum_{i=1}^{16} MV_i \cdot (15x_i^2 + 15y_i^2 - 1832)$$

Figure 3:
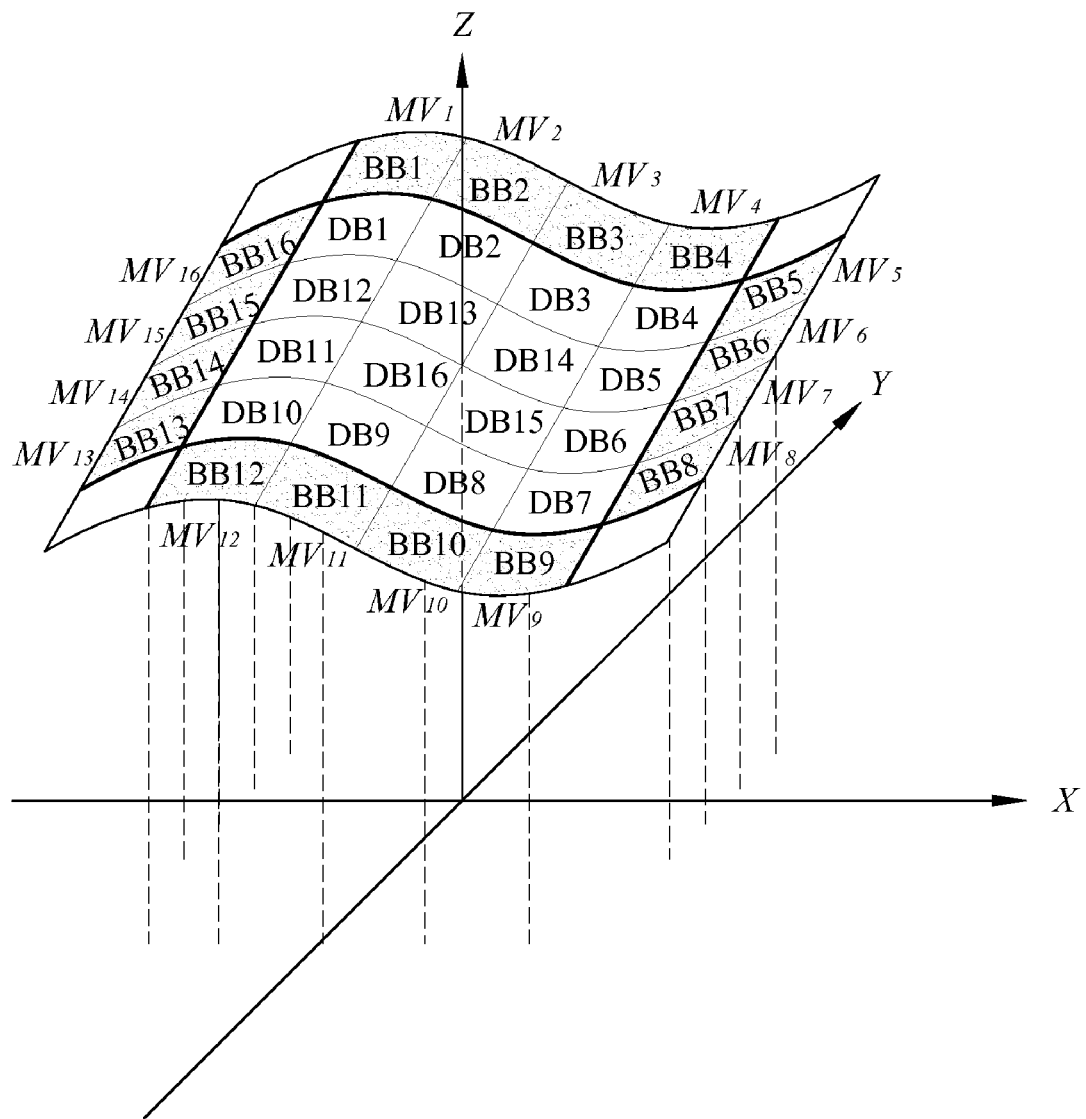
FIG. 3 is a schematic diagram illustrating boundary blocks according to an embodiment of the present invention.

A curved plane defined by the equation (2) is the desired OR plane. FIG. 3 is a schematic diagram illustrating boundary blocks according to an embodiment of the present invention. Referring to FIG. 3, at step S110, corresponding predicted spatial motion vectors of the missing blocks DB1 through DB16 can be obtained by the equation (2).

At step S120, temporal motion vectors are set up according to a previous image frame, i.e., taking motion vectors of the missing macroblock in the previous image frame at corresponding positions as high temporal correlated motion vectors.

At step S130, candidate motion vectors are constructed according to the boundary matching algorithm (BMA). As discussed above, the spatial motion vectors are obtained at step S110, the temporal VMs are obtained at step S120, and now at the current step, a quantitative difference between each spatial motion vector and each temporal motion vector can be estimated by the adjacent external boundary matching errors (AEBME). The motion vector having a least AEBME is selected as the candidate motion vector.

Figure 4:
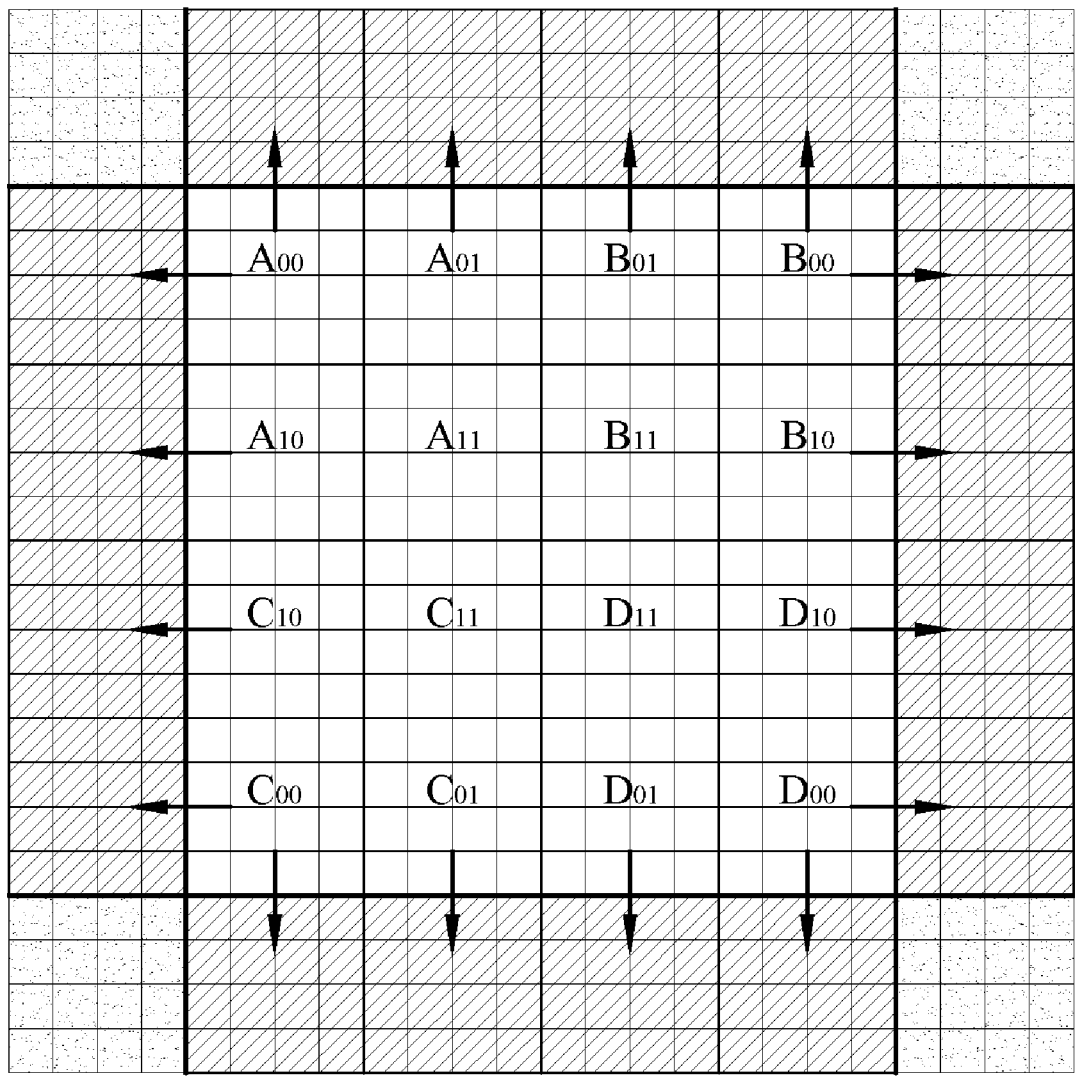
FIG. 4 is a schematic diagram illustrating a boundary matching algorithm (BMA) and related blocks according to a conventional technology.

FIG. 4 is a schematic diagram illustrating a boundary matching algorithm (BMA) and related blocks according to a conventional technology. Referring to FIG. 4, the 16 missing blocks of the missing macroblock 20 are renamed with A00, A01, A110, A11, B00, B01, B10, B11, C00, C01, C10, C11, D00, D01, D10, D11, for the convenience of illustration.

The missing blocks A11, B11, C11, D11 locate at an inside layer of the missing macroblock 20, and are not neighboring to the boundary blocks having correct image data. The rest missing blocks locate at an outside layer of the missing macroblock 20, and are neighboring to the boundary blocks having correct image data. In the current embodiment, only the missing blocks A00, A01, A10, A11 are illustrated, and the other missing blocks can be learnt by referring to the illustration of the missing blocks A00, A01, A10, A11, according to the symmetrical relation between the missing blocks.

The missing block A00 is neighboring to the boundary blocks BB1 and BB16, and an $AEBME_{00}$ value can be obtained according to equation (3):

$$AEBME_{00} = \sum_{i=1}^{M} \sum_{x=x_0}^{x_0-N-1} |A_{00}(x, y_0 + i) - R(x + v, y_0 + i + u)| + \sum_{i=1}^{M} \sum_{y=y_0}^{y_0-(N-1)} |A_{00}(x_0 - i, y) - R(x_0 - i + v, y + u)|, \quad (3)$$

in which $A_{00}(x, y)$ represents the pixels of the missing block A00 in the present frame, $R(x, y)$ represents the pixels of the previous frame, $(x_0, y_0)$ is the coordinate of the missing block $A_{00}$, (v, u) represents the spatial or temporal motion vector, N represents a quantity of the missing blocks (i.e., 4 in the current embodiment), and M represents a pixel width of the external boundary (i.e., 4 pixels in the current embodiment).

The missing block A10 is neighboring to the boundary blocks BB15, and an $AEBME_{10}$ value can be obtained according to equation (4):

$$AEBME_{10} = \sum_{i=1}^{M} \sum_{y=y_0}^{y_0-(N-1)} |A_{10}(x_0 - i, y) - R(x_0 - i + v, y + u)|, \quad (4)$$

in which, $A_{10}(x, y)$ represents the pixels of the missing block A10 in the present frame. Similarly, an $AEBME_{01}$ value of the missing block A01 neighboring to the boundary block BB2 can be obtained in like manner.

The missing blocks A11, B11, C11, D11 in the inside layer are not neighboring to any blocks having correct image data, and therefore they are determined with candidate motion vectors by majority decision according to missing blocks adjacent thereto.

Figure 5:
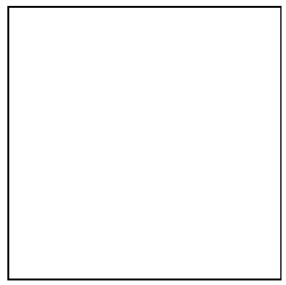
FIG. 5 is a schematic diagram illustrating boundary blocks according to an embodiment of the present invention.
Figure 5:
Figure 5:
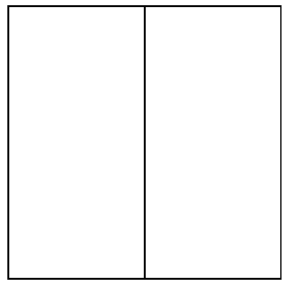
Figure 5:
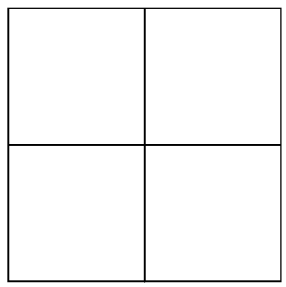

At step S140, according to a complexity of each candidate motion vector of the missing macroblock, the missing blocks are divided into a plurality of sub-macroblocks having optimal sizes, e.g., sub-macroblocks having 16×16, 16×8, 8×16, or 8×8 pixels as shown in FIG. 5, in which T1 represents 16×16 sub-macroblocks, T2 represents 16×8 sub-macroblocks, T3 represents 8×16 sub-macroblocks, and T4 represents 8×8 sub-macroblocks. According to the Laplacian distribution of the motion field constituted by the candidate motion vectors, one having the maximum probability is selected from the T1, T2, T3, and T4 sub-macroblocks by Bayes principle. If the missing macroblock has a relatively regular motion, then larger sub-macroblocks, e.g., sub-macroblocks of 16×16 pixels, are more suitable for subsequent motion refinement. On the contrary, if the missing macroblock has a relatively complex motion, the smaller sub-macroblocks, e.g., sub-macroblocks of 8×8 pixels, are more suitable for subsequent motion refinement.

The sub-macroblock having the maximum probability can be determined by equation (5):

$$\hat{T} = \max\{P(T_j | mv)\},$$
$$j \in \{1, 2, 3, 4\} = \max\left\{\frac{P(T_j \cap mv)}{P(mv)}\right\} = \max\left\{\frac{P(mv | T_j)P(T_j)}{P(mv)}\right\},$$

in which $P(T_j)$ represents a probability of a sub-macroblock $T_j$, and mv represents a motion vector motion vector.

Equation (5) can be further expressed in a form of equation (6):

$$\hat{T}' = \max\{P(mv | T_j)\} \quad (6)$$
$$= \max\left\{\prod_{k=1}^{N_j} P(mv_k | B_{k,j})\right\}$$
$$= \max\left\{\prod_{k=1}^{N_j} \left[\prod_{mv_k \in B_{k,j}} P(mv_k^x | B_{k,j}) \cdot P(mv_k^y | B_{k,j})\right]\right\},$$

in which $B_{k,j}$ represents the kth partition in the sub-macroblock $T_j$, $mv_k$ represents the motion vectors of the partition $B_k$, $mv_k^x$ represents a horizontal component of the motion vector ($mv_k$), $mv_k^y$ represents a vertical component of the motion vector ($mv_k$), $N_j$ represents the number of partitions in the missing macroblock, in which $N_j=1$ corresponding $T_1$, $N_j=2$ corresponding $T_2$, $N_j=2$ corresponding $T_3$, $N_j=4$ corresponding $T_4$.

According to equation (6), equation (7) can be obtained by the Laplacian-modeled motion field:

$$\hat{T}' = \max\left\{\prod_{k=1}^{N_j} \left[\prod_{mv_k \in B_{k,j}} P(mv_k^x | B_{k,j}) \cdot P(mv_k^y | B_{k,j})\right]\right\} \quad (7)$$
$$= \max\left\{\prod_{k=1}^{N_j} \left[\prod_{mv_k \in B_{k,j}} \frac{1}{2\sigma_k^x} \exp\left(\frac{-|mv_k^x - \mu_k^x|}{\sigma_k^x}\right) \cdot \frac{1}{2\sigma_k^y} \exp\left(\frac{-|mv_k^y - \mu_k^y|}{\sigma_k^y}\right)\right]\right\},$$

in which $\mu_k^x$ represents the average horizontal component, $\mu_k^y$ represents the average vertical component, while $\sigma_k^x$ and $\sigma_k^y$ can be expressed by:

$$\sigma_k^x = \frac{1}{\sqrt{2}a} \sum_{mv_k \in B_{k,j}} |mv_k^x - \mu_k^x|; \; \mu_k^x = \text{median}\{mv_k^x\}$$

$$\sigma_k^y = \frac{1}{\sqrt{2}a} \sum_{mv_k \in B_{k,j}} |mv_k^y - \mu_k^y|; \; \mu_k^y = \text{median}\{mv_k^y\}.$$

When taking a natural log to the above equation, we obtain equation (8):

$$\hat{T}' \approx \max_j \left\{ \sum_{k=1}^{N_j} (-a\ln\sigma_k^x - a\ln\sigma_k^y) \right\}.$$

At step S150, motion refinements are applied to the motion vectors of the sub-macroblocks of the missing macroblock. An adaptive search range (ASR) is obtained according to a first adjacent external boundary matching error (AEBME) at the starting point of a spiral scanning path, along with all of the motion vector values. If the ASR is equal to or less than a threshold value, the motion vector is taken as a motion vector of the missing macroblock, and the threshold value is determined by a proximity of the AEBME value to an original residual value of a sum of absolute differences (SAD).

The ASR is determined by equation (9) according to the AEBME:

$$ASR = \frac{|AEBME(u, v) - \mu|}{\mu} \times \max(D_x, D_y) \times \frac{W}{\lambda} + \varepsilon, \quad (9)$$

in which AEBME(u, v) represents the first adjacent external boundary matching error at the starting point, μ represents the original residual values of the SAD, W represents the maximum search size, and λ and ε are constant factors (λ=32 and ε=0). Further, $D_X$ and $D_Y$ can be expressed by equation (10):

$$D_x = \max |X(MVs) - u|$$

$$D_y = \max |Y(MVs) - v| \quad (10)$$

in which X(MVs) represents the X component of the motion vector, and Y(MVs) represents the Y component of the motion vector.

The dynamic threshold ($DT_a$) is expressed by equation (11):

$$DT_a = \mu + N \times \alpha \quad (11),$$

in which N is the total number of pixels, and α is a constant factor for each pixel.

Generally, μ is unavailable, and therefore α is needed in addition for calculating the dynamic threshold ($DT_a$).

Figure 6:
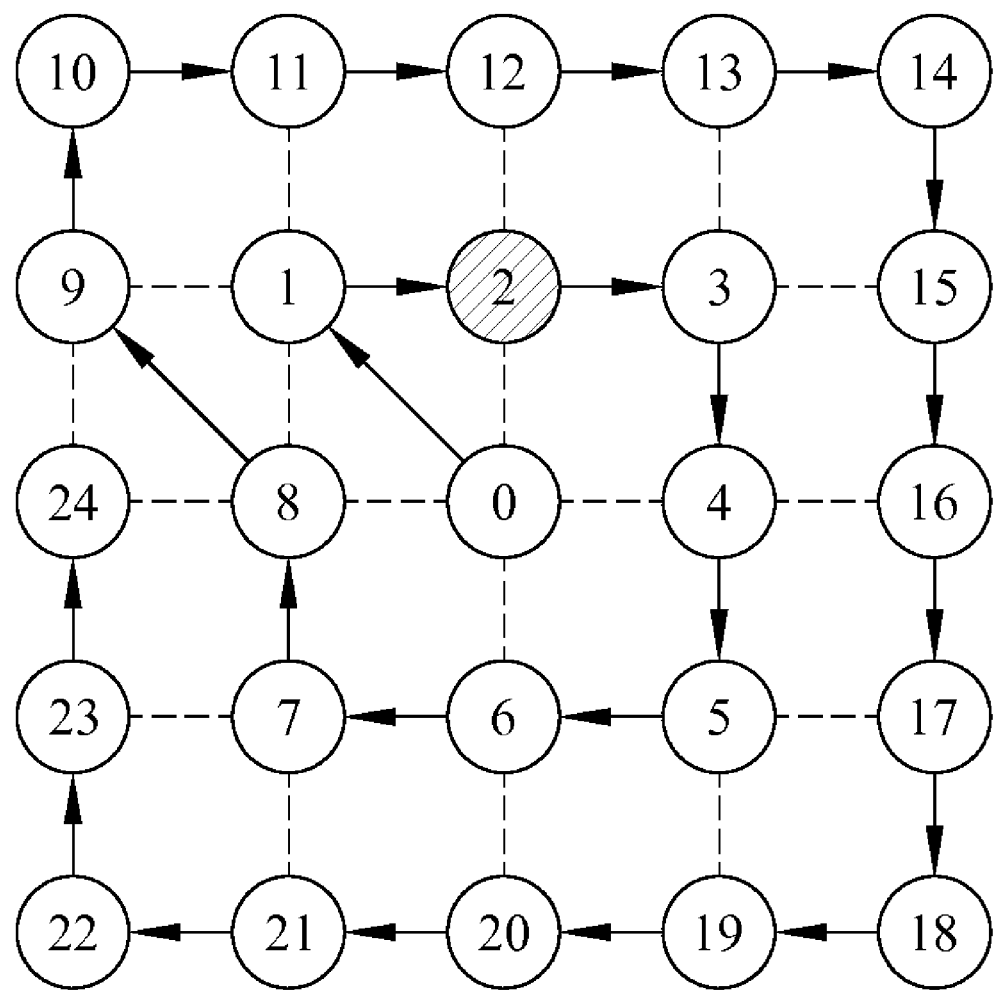
FIG. 6 is a schematic diagram illustrating a spiral scanning path according to an embodiment of the present invention.

FIG. 6 is a schematic diagram illustrating a spiral scanning path according to an embodiment of the present invention. Referring to FIG. 6, the spiral scanning path starts from a starting point marked with 0 (in the current embodiment, the starting point is an average motion vector of the candidate motion vectors), in sequence along indication of the arrows, to sequentially perform refinement, so as to search for the best motion vector. For example, the motion vector shown in FIG. 6 marked with 2 represents a desired motion vector, and therefore the motion refinement process processes only three motion vectors. The rest motion vectors are not to be further processed, and therefore the total computation for searching comparison process can be saved. The spiral scanning path of the present invention saves processing time. However, it should be noted that the spiral scanning path is an embodiment for illustrating the present invention without restrict the scope of the present invention and the spirit of the present invention. Any other path starting from a center point and spreading outwardly in a spiral manner should be construed as within the scope of the present invention.

As such, the motion vector of the missing macroblock is obtained at step S150.

Finally, at step S180, the image data of the missing macroblock can be obtained by moving the candidate macroblock to the position of the missing macroblock according to the motion vector, and thus concealing the negative affection caused by the missing macroblock to the entire image frame.

The experimental environment of the present invention is based upon the H.264 reference software of Joint Model (JM), provided by the JVT committee (Joint Video Team of ISO/IEC MPEG and ITU-T VCEG). Several standard video streams including CIF (352×288) and QCIF (176×144) are tested for evaluating the video quality. The high resolution video stream is encoded at 1 I-frame, with random packet lost errors at different specified loss ratios (different rates) generated by a Flexible Macroblock Ordering (FMO) technique, which are assumed to be caused by transmission errors. Different random packet lost errors are used simultaneously at each different specified loss ratio.

The average peak signal-to-noise ratio (PSNR) of a video stream is employed to give a quantitative evaluation of the quality of the reconstructed image. It is assumed that there is no packet lost from the initial decoded frame. In order to illustrate the performance of the TEC method of the present invention, the performance of the proposed TEC method is compared to the JM method by using several standard video sequences at 1%, 5%, and 10% error rates respectively.

Figure 7:
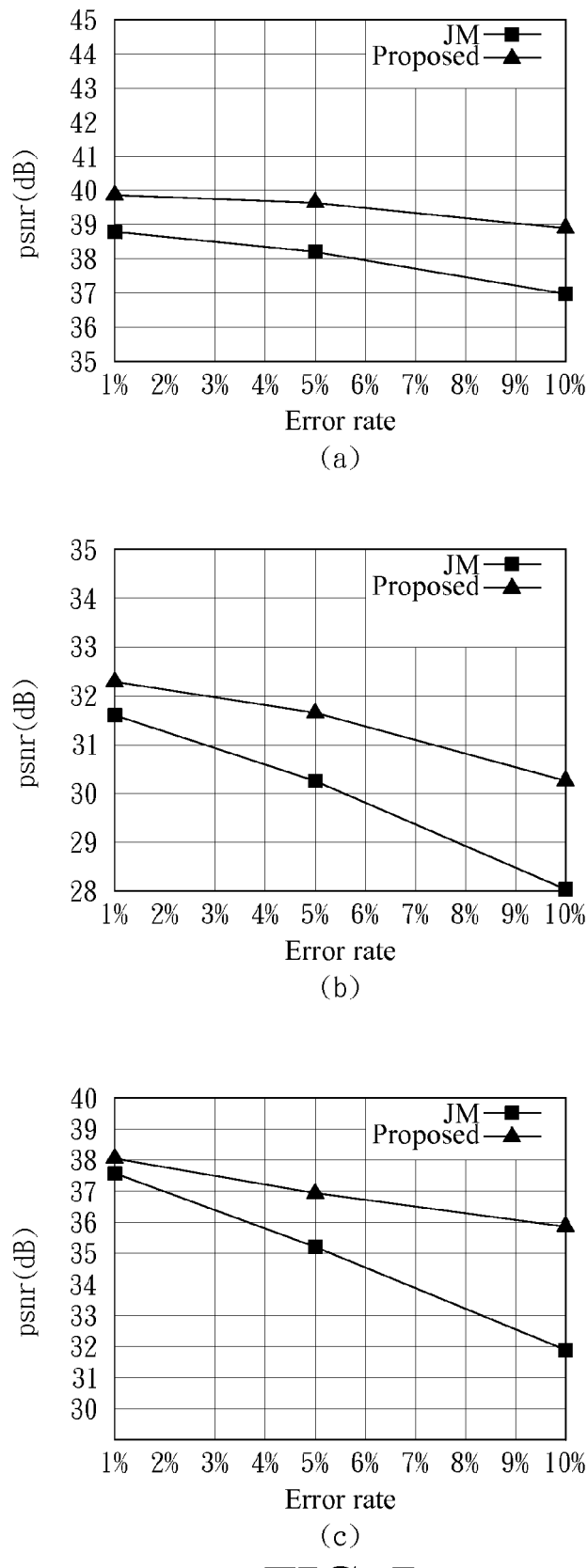
FIG. 7 is a data plot diagram of the TEC method of the present invention.

FIG. 7 is a data plot diagram of the TEC method of the present invention. As shown in FIG. 7, the TEC method of the present invention performs a better image quality than the conventional JM method. For example, regarding the standard video stream "Container", in a condition of having an error rate of about 1%, the PSNR of the TEC method is better than the JM method for 1.0 dB; in a condition of having an error rate of about 5%, the PSNR of the TEC method is better than the JM method for 1.7 dB; and in a condition of having an error rate of about 10%, the PSNR of the TEC method is better than the JM method for 2.0 dB. Meanwhile, the TEC method of the present invention improves the computation speed for about 1.12 times comparing with the conventional method. Other standard video streams, such as "football", "foreman" are also illustrated in FIG. 7.

Table 1 shows the image quality factors of TEC method. In table 1, the ΔPSNR represents PSNR differences between the present invention with variable block sizes and the conventional method without variable block sizes, in conditions of having an error rate of 5%, 10%, and 20%. For example, in a condition of having an error rate of 10%, the ΔPSNR with respect to "Container" is 0.02 dB, the ΔPSNR with respect to "Foreman" is 0.03 dB, and the ΔPSNR with respect to "Football" is 0.04 dB, (i.e., 0.02 dB, 0.03 dB, and 0.04 dB, respectively). It can be learnt from table 1 that the TEC method employing variable block sizes of the present invention is adapted for significantly improve the image quality of video products.

TABLE 1

| ΔPSNR | Error Rate 5% | Error Rate 10% | Error Rate 20% |
| --- | --- | --- | --- |
| Container | 0.01 | 0.02 | 0.04 |
| Foreman | 0.01 | 0.03 | 0.08 |
| Football | 0.02 | 0.04 | 0.09 |

The TEC method according to the present invention not only saves the computation time and accelerates the processing speed, but also provides a high efficient image decoding method.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A temporal error concealment (TEC) method, for generating a replacement macroblock (macroblock) for filling up a missing macroblock according to a correct image data of a previous image frame and a part of correct image data of a current image frame, thus concealing a negative affection caused by the missing macroblock to the current frame, wherein each of the previous frame and the current frame comprises a plurality of macroblocks, and each of the macroblocks comprises a plurality of pixels, and an image data of the missing macroblock is incorrect, the TEC method comprising:

dividing the missing macroblock into a plurality of N×N pixel missing blocks, wherein N is a positive integer;

dividing a plurality of N-pixel-wide boundary macroblocks surrounding the missing macroblock into a plurality of N×N pixel boundary blocks;

constructing an optimal regression (OR) plane by a multiple polynomial regression equation according to motion vectors (motion vectors) of the boundary blocks surrounding the missing macroblock;

predicting a spatial motion vector of the missing blocks, according to the OR plane;

taking a motion vector of a macroblock in the previous frame at a position corresponding to the missing macroblock as a temporal motion vector;

selecting a spatial motion vector or a temporal motion vector having a least adjacent external boundary matching error (AEBME) as a candidate motion vector, according to a boundary matching algorithm (BMA);

dividing the missing macroblock into a plurality of sub-macroblocks (sub-macroblocks) having less pixels, according to a motion field and a Laplacian probability distribution of the candidate motion vector;

comparing an adaptive search range (ASR) with a dynamic threshold value ($DT_a$), following a spiral scanning path starting from a starting point which is an average motion vector of the candidate motion vector and spirally spreading outward, along all motion vectors of the boundary blocks, wherein if the ASR is equal to or smaller than the threshold value, it indicates that the desired motion vector has been obtained and the search is terminated, or otherwise if all of the ASR are greater than the threshold value, one having a least ASR among the motion vectors is selected as the desired motion vector; and moving the replacement macroblock to the position of the missing macroblock according to the motion vector for filling up the image data of the missing macroblock, and thus concealing a negative affection caused by the missing macroblock to the entire image frame.

2. The TEC method according to claim 1, wherein the N is 4.

3. The TEC method according to claim 2, wherein the OR plane can be expressed by an equation of:

$$Z(x, y) = \left[\frac{1}{106496}\sum_{i=1}^{16} MV_i \cdot (27x_i^2 + 25y_i^2 - 3120)\right]x^2 +$$

-continued $$\left[\frac{1}{960}\sum_{i=1}^{16} MV_i \cdot x_i\right]x + \left[\frac{1}{106496}\sum_{i=1}^{16} MV_i \cdot (25x_i^2 + 27y_i^2 - 3120)\right]y^2 +$$

$$\left[\frac{1}{960}\sum_{i=1}^{16} MV_i \cdot y_i\right]y - \frac{1}{512}\sum_{i=1}^{16} MV_i \cdot (15x_i^2 + 15y_i^2 - 1832),$$

wherein $Z(x, y)$ represents the spatial motion vector of the missing macroblock, $MV_i$ represents motion vectors of the boundary blocks, and $x_i$ and $y_i$ represent coordinates of the boundary blocks when a center of the missing macroblock is taken as a coordinate origin.

4. The TEC method according to claim 1, wherein the sub-macroblocks having less pixels are sub-macroblocks having 16×16, 16×8, 8×16, or 8×8 pixels, represented as T1 sub-macroblock, T2 sub-macroblock, T3 sub-macroblock, and T4 sub-macroblock, respectively.

5. The TEC method according to claim 4, wherein the missing macroblock is divided into T1 sub-macroblock, T2 sub-macroblock, T3 sub-macroblock or T4 sub-macroblock according to an equation of:

$$\hat{T} = \max\left\{\prod_{k=1}^{N_j}\left[\prod_{mv_k \in B_{k,j}} \frac{1}{2\sigma_k^x}\exp\left(\frac{-|mv_k^x - \mu_k^x|}{\sigma_k^x}\right) \cdot \frac{1}{2\sigma_k^y}\exp\left(\frac{-|mv_k^y - \mu_k^y|}{\sigma_k^y}\right)\right]\right\},$$

wherein $mv_k^x$ represents a horizontal component of the motion vector, $mv_k^y$ represents a vertical component of the motion vector, $\mu_k^x$ represents an average horizontal component of the motion vector, $\mu_k^y$ represents an average vertical component of the motion vector, while $\sigma_k^x$ and $\sigma_k^y$ is expressed by:

$$\sigma_k^x = \frac{1}{\sqrt{2a}}\sum_{mv_k \in B_{k,j}} |mv_k^x - \mu_k^x|;\ \mu_k^x = \text{median}\{mv_k^x\}$$

$$\sigma_k^y = \frac{1}{\sqrt{2a}}\sum_{mv_k \in B_{k,j}} |mv_k^y - \mu_k^y|;\ \mu_k^y = \text{median}\{mv_k^y\}.$$

6. The TEC method according to claim 5, wherein the equation of $$\hat{T} = \max\left\{\prod_{k=1}^{N_j}\left[\prod_{mv_k \in B_{k,j}} \frac{1}{2\sigma_k^x}\exp\left(\frac{-|mv_k^x - \mu_k^x|}{\sigma_k^x}\right) \cdot \frac{1}{2\sigma_k^y}\exp\left(\frac{-|mv_k^y - \mu_k^y|}{\sigma_k^y}\right)\right]\right\}$$

is taken with a natural log to obtain an equation of $$\hat{T}' \approx \max_j\left\{\sum_{k=1}^{N_j}(-a\ln\sigma_k^x - a\ln\sigma_k^y)\right\}.$$

7. The TEC method according to claim 1, wherein an AEBME of a missing block positioned at a corner of the missing macroblock is expressed by an equation of:

$$AEBME_{00} = \sum_{i=1}^{M} \sum_{x=x_0}^{x_0+N-1} |A_{00}(x, y_0 + i) - R(x + v, y_0 + i + u)| +$$

$$\sum_{i=1}^{M} \sum_{y=y_0}^{y_0-(N-1)} |A_{00}(x_0 - i, y) - R(x_0 - i + v, y + u)|,$$

wherein $A_{00}(x, y)$ represents the pixels of the missing block $A_{00}$ in the present frame, $R(x, y)$ represents the pixels of the previous frame, $(x_0, y_0)$ is the coordinate of the missing block $A_{00}$, $(v, u)$ represents the spatial or temporal motion vector, N represents a quantity of the missing blocks and N=4, and M represents a pixel width of the external boundary and M=4.

8. The TEC method according to claim 1, wherein an AEBME of a missing block which is adjacent to only one boundary block is expressed by an equation of:

$$AEBME_{10} = \sum_{i=1}^{M} \sum_{y=y_0}^{y_0-(N-1)} |A_{10}(x_0 - i, y) - R(x_0 - i + v, y + u)|,$$

wherein $A_{10}(x, y)$ represents the pixels of the missing block $A_{10}$ in the present frame.

9. The TEC method according to claim 1, wherein an AEBME of a missing block which is not adjacent to the boundary blocks are determined with candidate motion vectors by majority decision according to three missing blocks adjacent thereto.

10. The TEC method according to claim 1, wherein the ASR is defined as:

$$ASR = \frac{|AEBME(u, v) - \mu|}{\mu} \times \max(D_x, D_y) \times \frac{W}{\lambda} + \varepsilon,$$

wherein AEBME(u, v) represents a first adjacent external boundary matching error at the starting point, $\mu$ represents an original residual values of a sum of absolute differences (SAD), W represents a maximum search size, $\lambda$ is a constant factor 32, and $\epsilon$ are constant factors 0, and $D_X$ and $D_Y$ are defined as $$D_x = \max|X(MVs) - u|$$
$$D_y = \max|Y(MVs) - v|,$$

wherein X(MVs) represents an X component of the motion vector, and Y(MVs) represents a Y component of the motion vector.

11. The TEC method according to claim 1, wherein the dynamic threshold ($DT_a$) is expressed by $DT_a=\mu+N\times\alpha$, wherein N is the total number of pixels, and $\alpha$ is a constant factor for each pixel.

* * * * *